(12) United States Patent
Yelahanka Raghuprasad et al.

(10) Patent No.: US 12,143,290 B2
(45) Date of Patent: Nov. 12, 2024

(54) IDENTIFYING TRAFFIC SENSITIVE INTERFACES AND TRIGGERING CONFIGURATION CHANGES

(71) Applicant: Cisco Technology, Inc., San Jose, CA (US)

(72) Inventors: Mukund Yelahanka Raghuprasad, San Jose, CA (US); Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/871,142

(22) Filed: Jul. 22, 2022

(65) Prior Publication Data

US 2024/0031278 A1   Jan. 25, 2024

(51) Int. Cl.
*H04L 43/55* (2022.01)
*H04L 45/12* (2022.01)
*H04L 45/28* (2022.01)

(52) U.S. Cl.
CPC ............ *H04L 45/123* (2013.01); *H04L 43/55* (2022.05); *H04L 45/28* (2013.01)

(58) Field of Classification Search
CPC ........ H04L 45/123; H04L 45/28; H04L 43/55
See application file for complete search history.

(56) References Cited

U.S. PATENT DOCUMENTS

| | | | |
|---|---|---|---|
| 9,391,849 B2 | 7/2016 | Abraham et al. | |
| 10,958,555 B2 | 3/2021 | Kumar et al. | |
| 2010/0268524 A1* | 10/2010 | Nath | H04L 67/306 709/224 |
| 2019/0036816 A1* | 1/2019 | Evans | H04L 41/5009 |

(Continued)

FOREIGN PATENT DOCUMENTS

WO   2022073576   4/2022

OTHER PUBLICATIONS

Madanapalli et al. "Assisting Delay and Bandwidth Sensitive Applications in a Self-Driving Network", https://dl.acm.org/doi/pdf/10.1145/3341216.3342215 (Year: 2019).*

(Continued)

*Primary Examiner* — James E Springer
*Assistant Examiner* — Patrick F Ngankam
(74) *Attorney, Agent, or Firm* — BEHMKE INNOVATION GROUP LLC; James M. Behmke; James J. Wong

(57) ABSTRACT

In one embodiment, a device obtains quality of experience metrics for an online application whose traffic traverses a particular interface of a router located at a first site in a network. The device identifies a correlation between throughput of the particular interface and the quality of experience metrics for the online application. The device makes a determination that the correlation is a root cause of degradation of the quality of experience metrics for the online application at least in part by determining whether throughput of an interface of a remote router located at a second site in the network is correlated with the quality of experience metrics. The device configures, based on the determination, a priority queue associated with the particular interface for use by traffic of the online application.

20 Claims, 14 Drawing Sheets

(56) References Cited

U.S. PATENT DOCUMENTS

| | | | |
|---|---|---|---|
| 2020/0296023 A1* | 9/2020 | Kumar | H04L 43/12 |
| 2021/0273870 A1 | 9/2021 | Xiao et al. | |
| 2022/0166663 A1* | 5/2022 | Banka | H04L 41/0677 |
| 2023/0069074 A1* | 3/2023 | Chen | G06F 11/3409 |

OTHER PUBLICATIONS

Madanapalli et al. "Assisting delay and Bandwidth Sensitive Applications in a self-driving network", https://dl.acm.org/doi/10.1145/3341216.3342215 (Year: 2019).*

Madanapalli, et al., "Assisting Delay and Bandwidth Sensitive Applications in a Self-Driving Network", NetAI '19, Aug. 23, 2019, 6 pages, Association for Computing Machinery, Beijing, China.

* cited by examiner

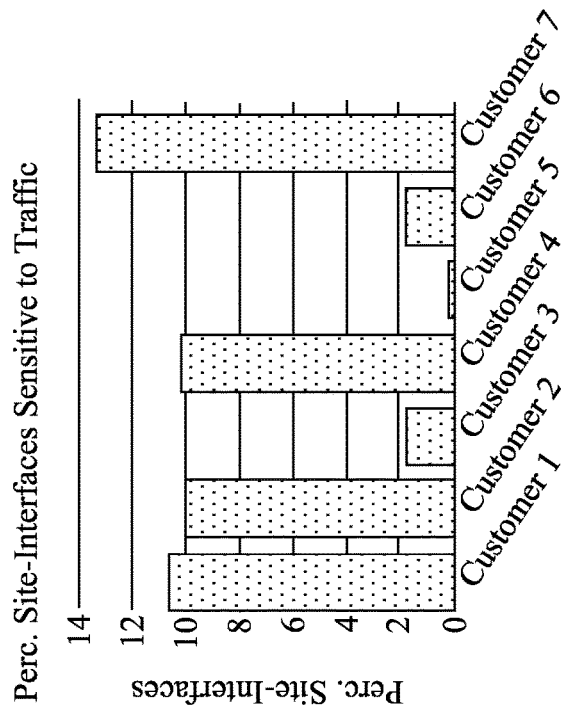
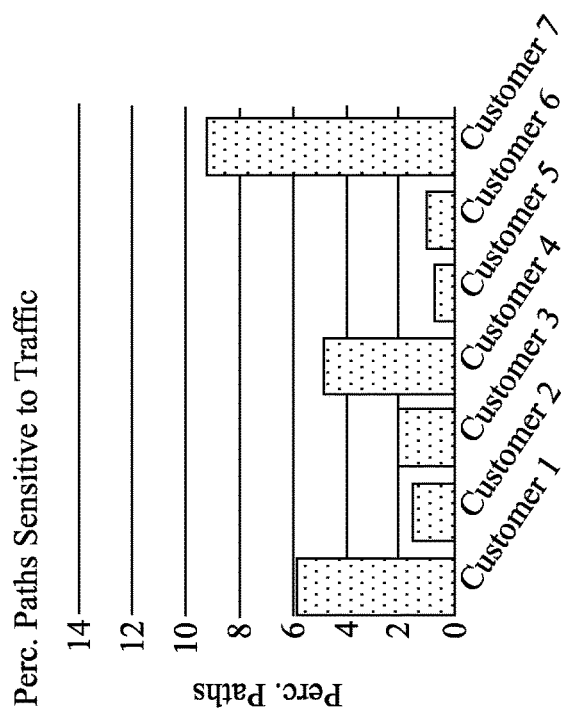
FIG. 8A
FIG. 8B

IDENTIFYING TRAFFIC SENSITIVE INTERFACES AND TRIGGERING CONFIGURATION CHANGES

TECHNICAL FIELD

The present disclosure relates generally to computer networks, and, more particularly, to identifying traffic sensitive interfaces and triggering configuration changes.

BACKGROUND

In recent years, more and more applications have moved to the cloud, with software-as-a-service (SaaS) becoming a popular delivery model. In contrast to locally-run applications, the user experience of an online application is also a function of the performance of the network providing connectivity to the online application. Accordingly, one consideration when provisioning a new site is the required bandwidth to connect to a point of presence (PoP).

Testing has revealed that certain network paths and endpoint interfaces can be sensitive to increases in traffic, resulting in degradation of the user experience of an online/SaaS application. This can be due, for instance, to bottlenecks in the network that are attributable to congestion at the edge device, low bandwidth allocation, or the like. In other cases, an endpoint interface may be sensitive to traffic increases and the cause of any degradation of the user experience.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8B illustrate example plots contrasting the percentages of paths that are sensitive to traffic increases versus site-interfaces that are sensitive to traffic increases;

DESCRIPTION OF EXAMPLE EMBODIMENTS

Overview

Figure 1A:
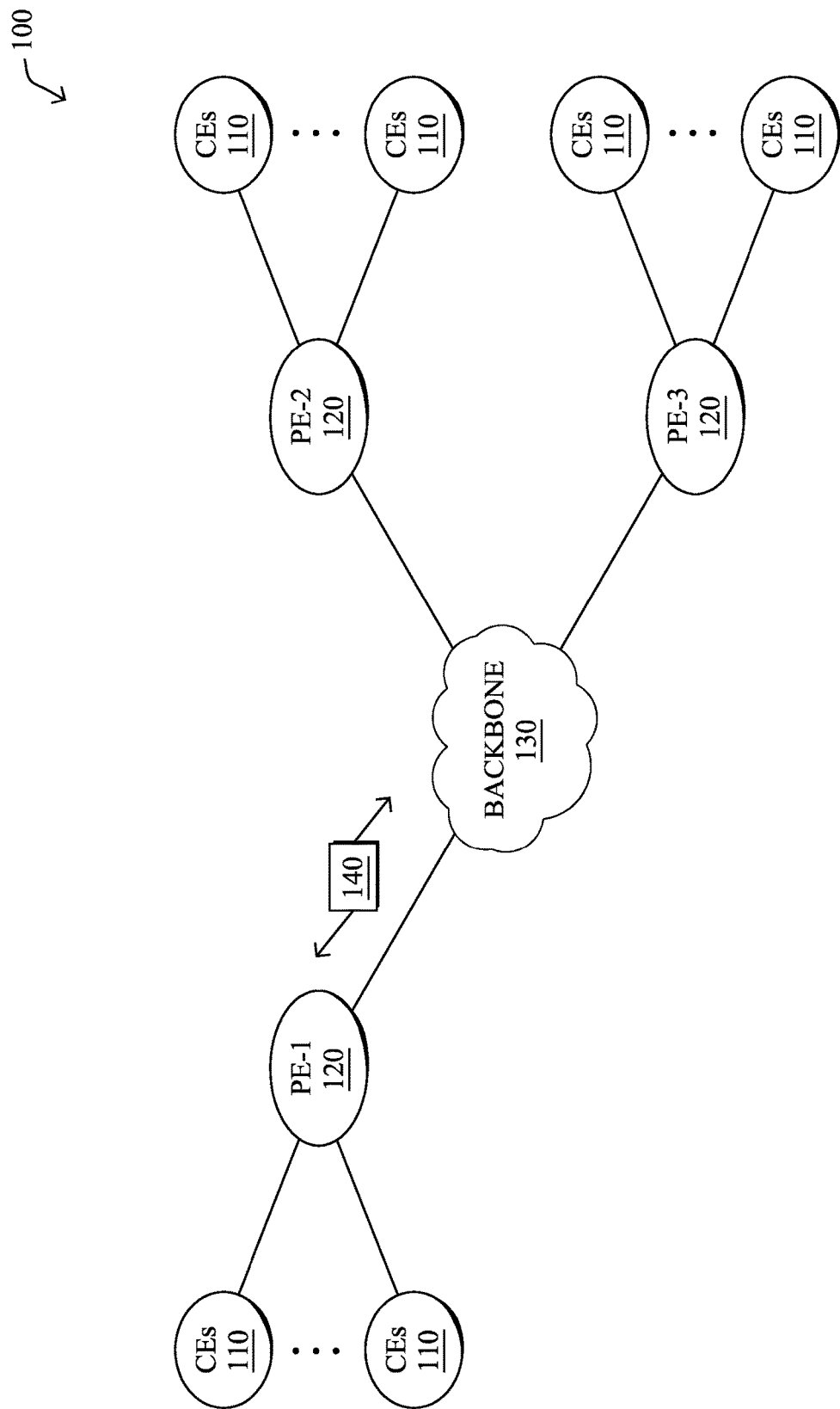
FIGS. 1A-1B illustrate an example communication network.

According to one or more embodiments of the disclosure, a device obtains quality of experience metrics for an online application whose traffic traverses a particular interface of a router located at a first site in a network. The device identifies a correlation between throughput of the particular interface and the quality of experience metrics for the online application. The device makes a determination that the correlation is a root cause of degradation of the quality of experience metrics for the online application at least in part by determining whether throughput of an interface of a remote router located at a second site in the network is correlated with the quality of experience metrics. The device configures, based on the determination, a priority queue associated with the particular interface for use by traffic of the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
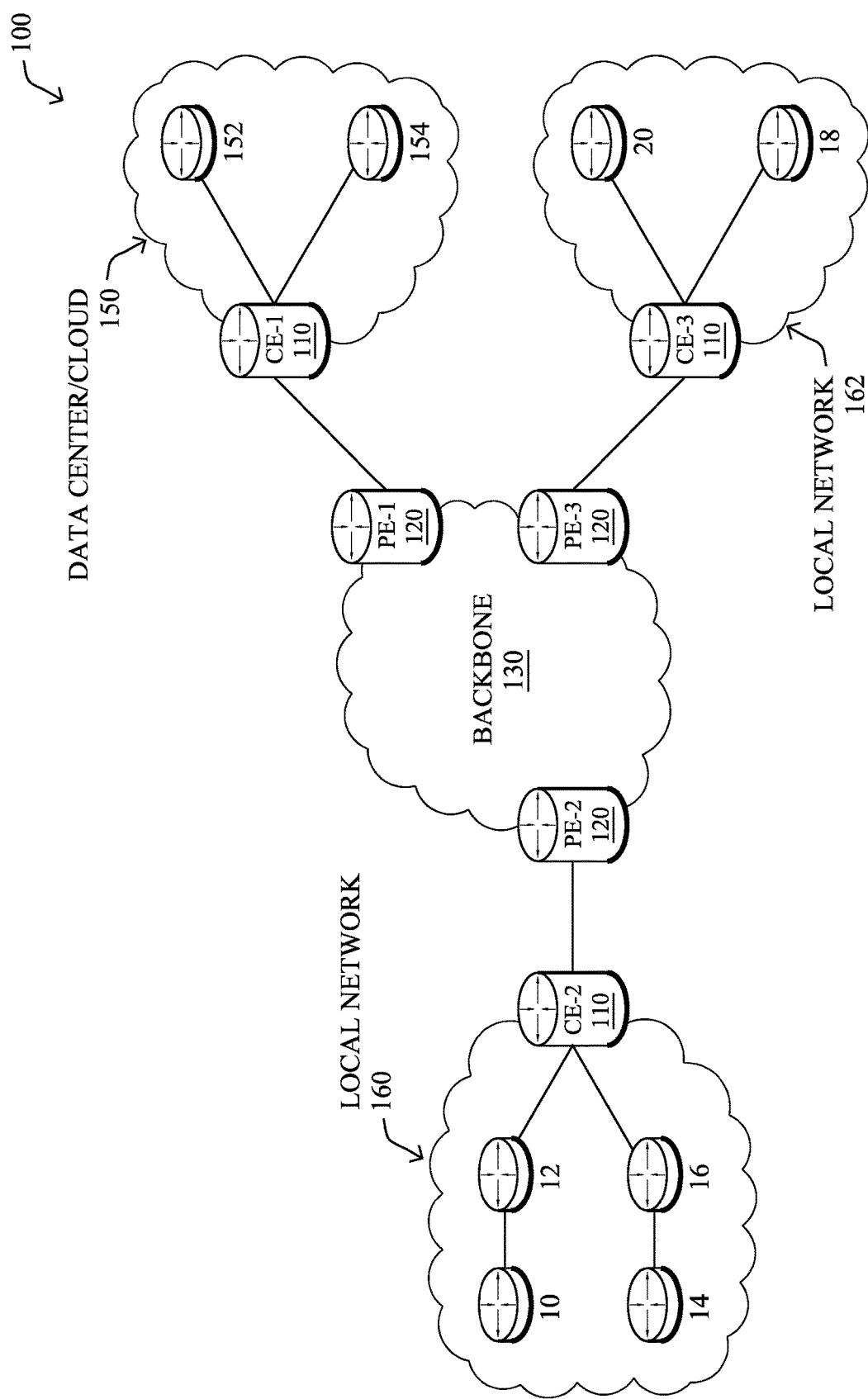

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
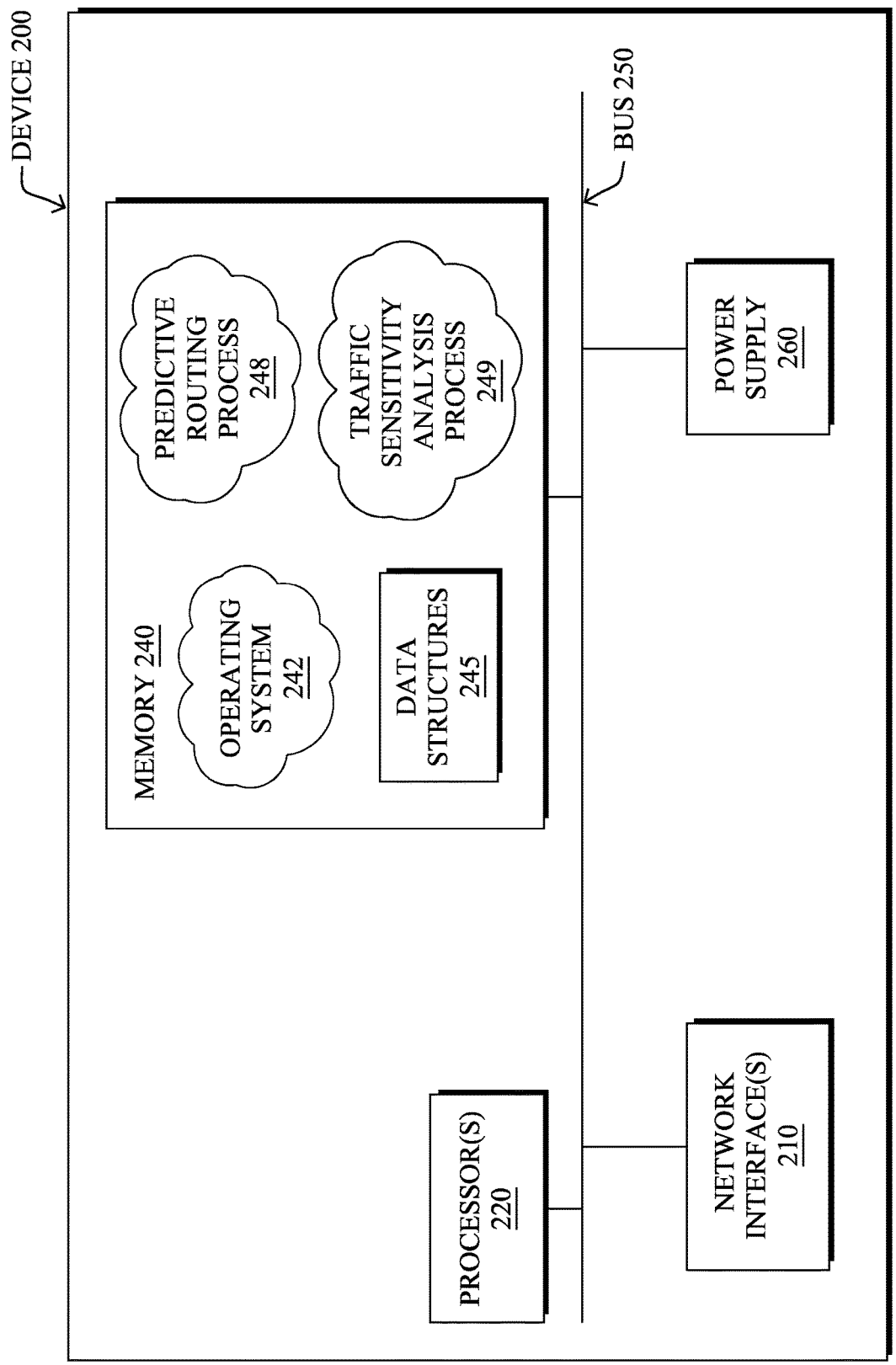
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a traffic sensitivity analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or traffic sensitivity analysis process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or traffic sensitivity analysis process 249 may include computer executable instructions that, when executed by processor(s) 220, cause device 200 to perform the techniques described herein. To do so, in some embodiments, predictive routing process 248 and/or traffic sensitivity analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or traffic sensitivity analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or traffic sensitivity analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
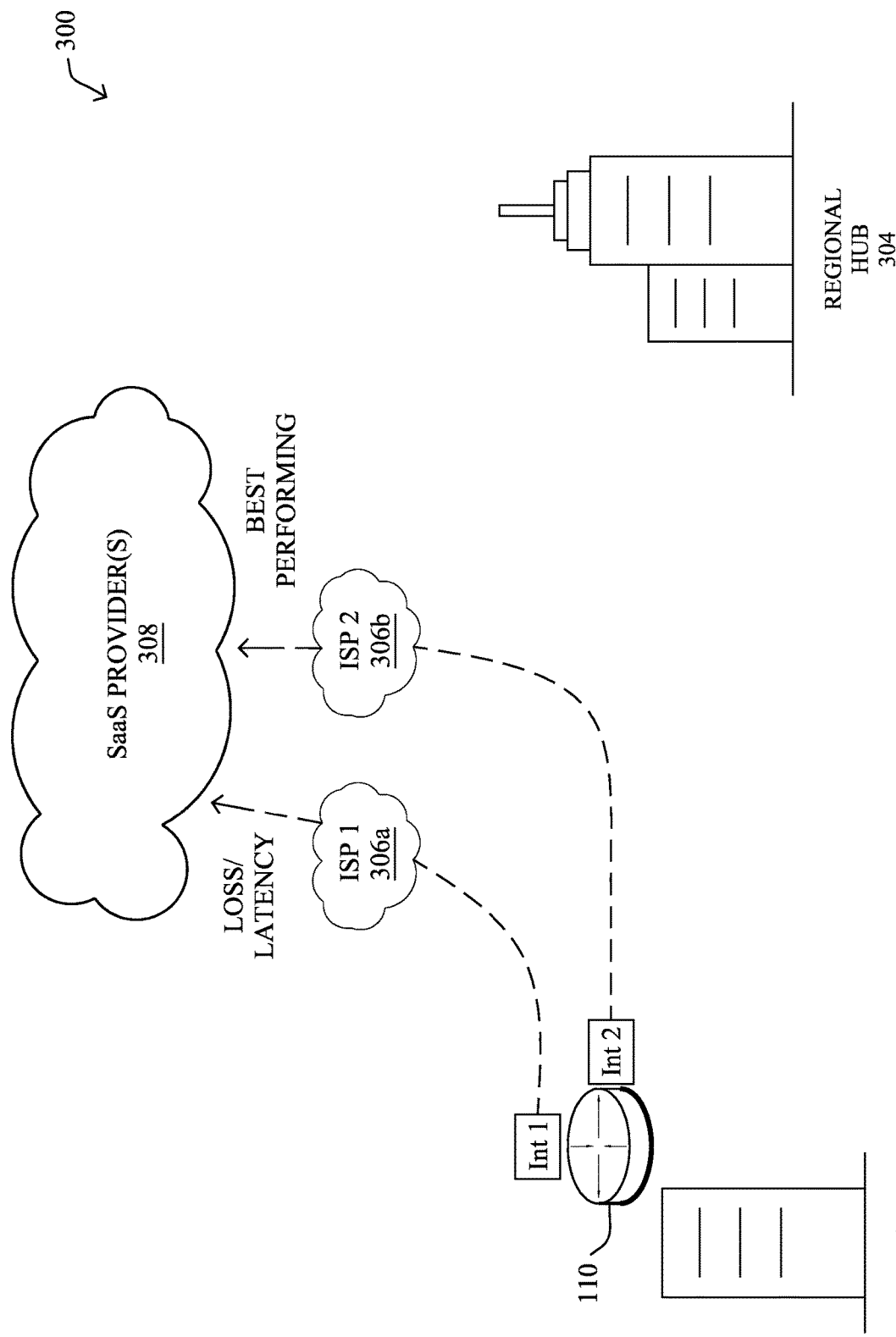
FIGS. 3A-3B illustrate example network deployments.
Figure 3B:
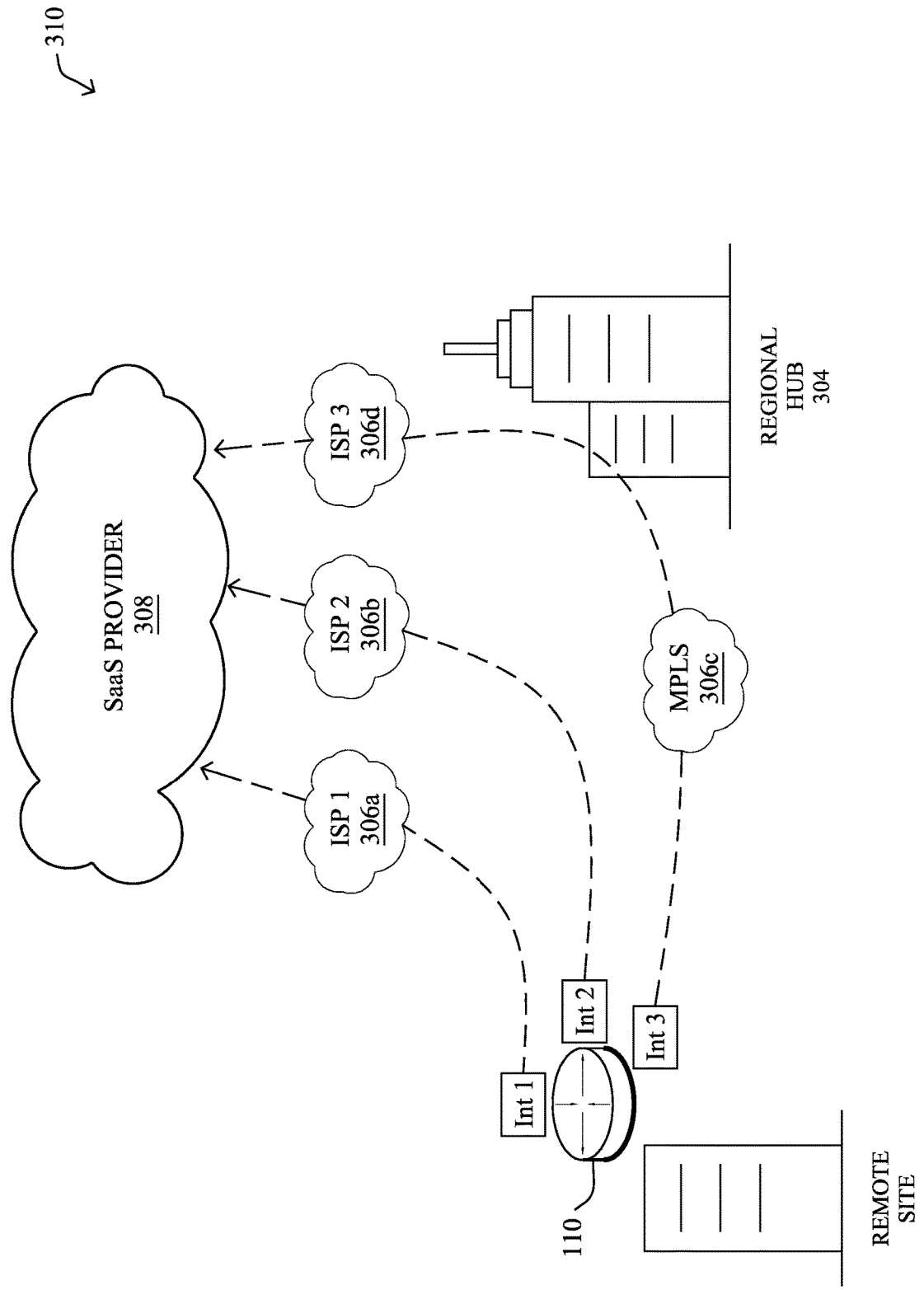

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
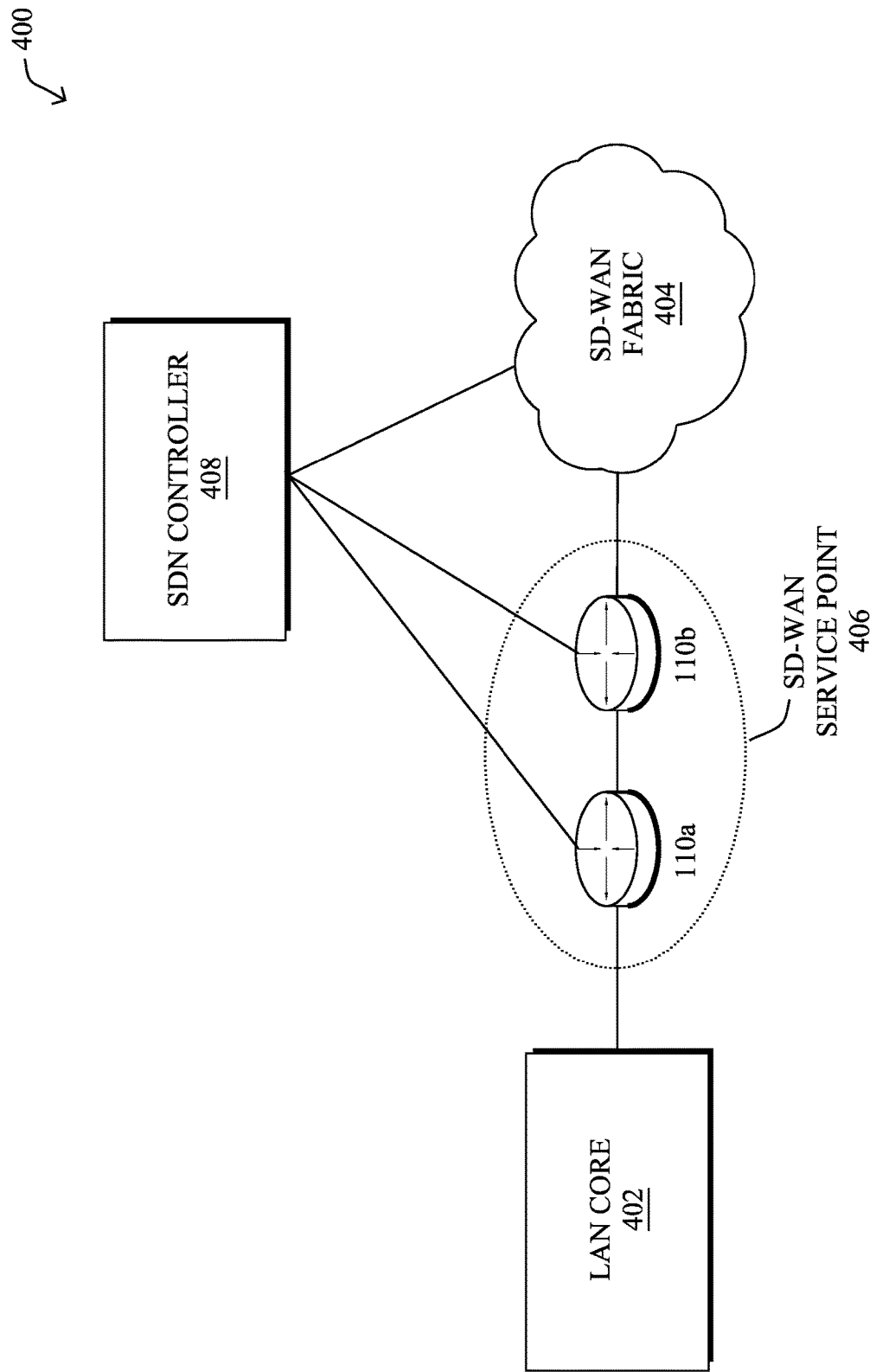
FIGS. 4A-4B illustrate example software defined network (SDN) implementations.

FIG. 4A illustrates an example SDN implementation 401), according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast pith the notion of an informed decision.
- SLA failures are very common in the Internet and a good proportion of them could be avoided (e.g., using an alternate path), if predicted in advance.

Figure 4B:
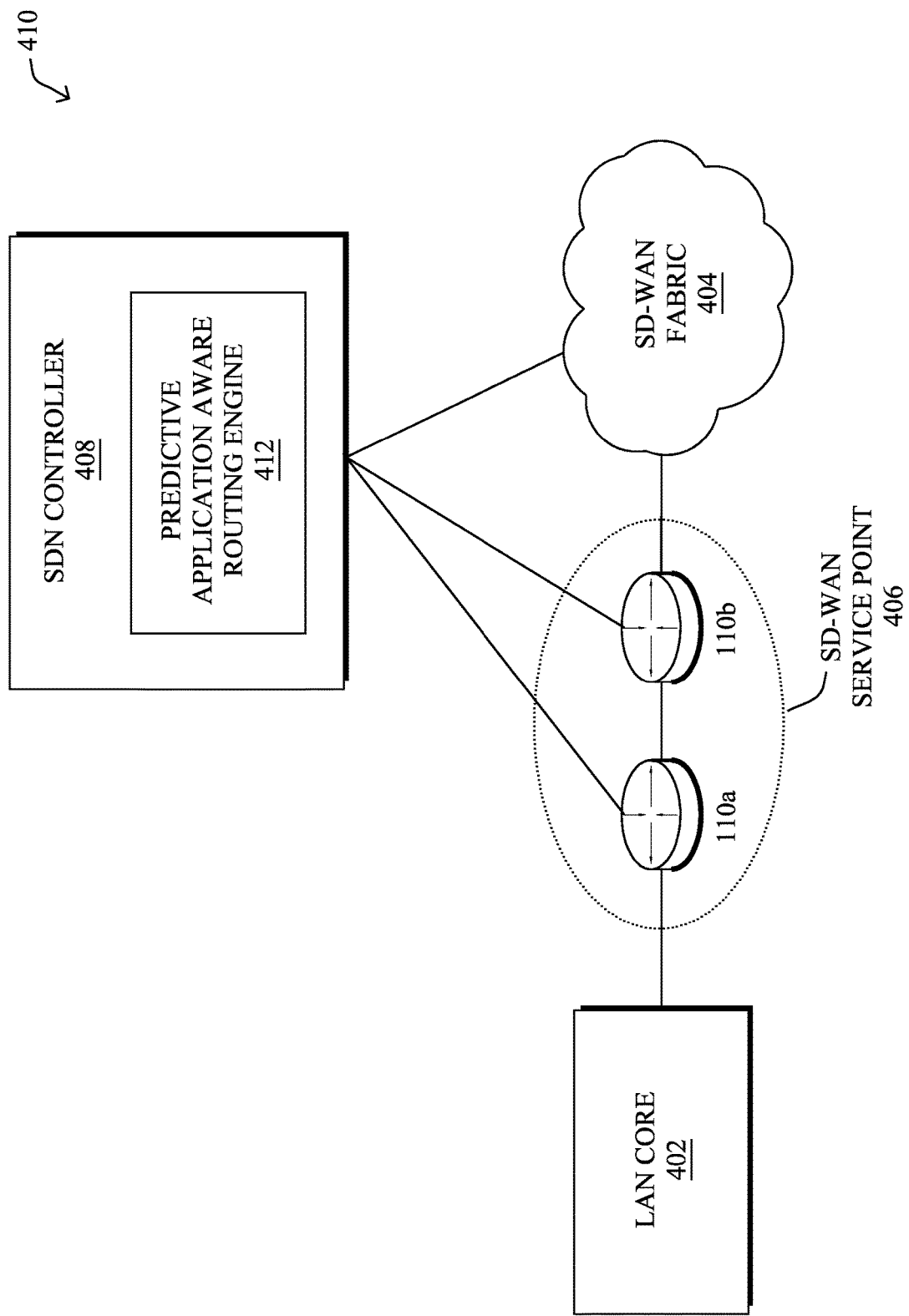

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, application-aware routing approaches, such as those used by predictive application aware routing engine 412, can aid in ensuring that the user experience of an online application remains acceptable. However, underlying those decisions is another network consideration: the bandwidth provisioned for a site deployment to connect to a point of presence (PoP). This can be a challenging task, as the traffic generated by the site is usually unknown until after deployment. Incorrectly configured bandwidth allocations can then lead to degradations in the QoE/user experience of an online application accessed from that site.

Moreover, testing has revealed that certain network paths and endpoint interfaces can be sensitive to increases in their traffic loads, leading to potential degradation in the QoE of an online application. This can be due, for instance, to either: 1.) a local link being misconfigured or 2.) a bottleneck being present deeper in the network. As used herein, an interface or network path is considered to be "traffic sensitive" if degradation to the application QoE is observed that corresponds to an increase in the traffic along that interface or path.

—Identifying Traffic Sensitive Interfaces and Triggering Configuration Changes—

The techniques introduced herein seek to improve the bandwidth provisioning on links that are traffic sensitive by first identifying interfaces that are potentially traffic sensitive. In further aspects, the techniques herein are also able to verify that the root cause of the traffic sensitivity is local link congestion and not congestion deeper into the network. Once identified, the techniques herein also propose an approach to improve the bandwidth provisioning of the interface suffering congestion, to improve the QoE of the application. In another aspect, if the traffic sensitivity continues to persist, the techniques herein may also send a notification to an administrator or other party that the bandwidth capacity of the local link or the service provider contract should be increased.

Illustratively, the techniques described herein may be performed by hardware, software, and/or firmware, such as in accordance with traffic sensitivity analysis process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device obtains quality of experience metrics for an online application whose traffic traverses a particular interface of a router located at a first site in a network. The device identifies a correlation between throughput of the particular interface and the quality of experience metrics for the online application. The device makes a determination that the correlation is a root cause of degradation of the quality of experience metrics for the online application at least in part by determining whether throughput of an interface of a remote router located at a second site in the network is correlated with the quality of experience metrics. The device configures, based on the determination, a priority queue associated with the particular interface for use by traffic of the online application.

Operationally, a key observation from testing has revealed that the potential traffic sensitivity of an interface can be identified by assessing the correlation between application QoE metrics, such as measurements of the probability of an SLA violation, scores based on user-provided feedback/ratings, mean opinion scores (MOS), or the like, and the corresponding traffic metrics. However, such a correlation may not be attributable to the interface itself, but instead is due to bottlenecks specific to the network path/endpoint interface.

By way of example, consider a network path that carries seasonal traffic that peaks during normal working hours. It may very well be that the application QoE is also degraded during these hours, simply because the load on the entire network is high during those hours and not due to any misconfiguration of any particular interface. Thus, even though the QoE degradation may be correlated with the increase in traffic during these times, the corresponding interface under consideration is not itself traffic sensitive. Accordingly, the techniques herein also introduce techniques to verify the traffic sensitivity of a given interface, so that appropriate actions can be taken (e.g., traffic engineering, increasing the of local link bandwidth, hardware/software upgrades for edge devices, increasing the buffer size, etc.).

Figure 5:
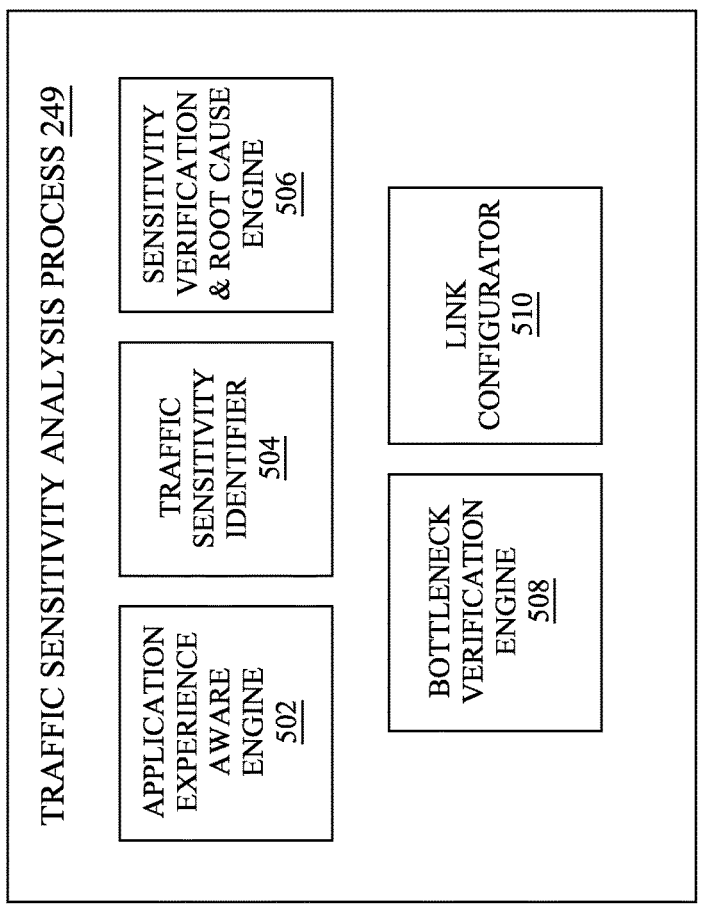
FIG. 5 illustrates an example architecture for identifying traffic sensitive interfaces and triggering configuration changes.

FIG. 5 illustrates an example architecture for identifying traffic sensitive interfaces and triggering configuration changes, according to various embodiments. At the core of architecture 500 is traffic sensitivity analysis process 249, which may be executed by a controller for a network, a server, a networking device, or another device in communication therewith. For instance, traffic sensitivity analysis process 249 may be executed by a controller for a network (e.g., SDN controller 408 in FIGS. 4A-4B, a path computation element, etc.), a particular networking device in the network (e.g., a router, etc.), another device or service in communication therewith, or the like. In further embodiments, architecture 500 may be implemented as part of a secure access service edge (SASE) deployment.

As shown, traffic sensitivity analysis process 249 may include any or all of the following components: an application experience aware engine 502, a traffic sensitivity identifier 504, a sensitivity verification and root causing engine 506, a bottleneck verification engine 508, and/or a link configurator 510. As would be appreciated, the functionalities of these components may be combined or omitted, as desired. In addition, these components may be implemented on a singular device or in a distributed manner, in which case the combination of executing devices can be viewed as their own singular device for purposes of executing traffic sensitivity analysis process 249.

In general, traffic sensitivity analysis process 249 may operate in three main stages: a first stage in which information regarding the traffic flows and application QoE are collected for any application of interest, a second stage in which interfaces and paths that are traffic sensitive are identified and verified, and a final stage in which corrective measures are taken with respect to alleviate the effects of the traffic sensitivity In various embodiments, application experience aware engine 502 may be responsible for obtaining metrics indicative of the application experience for a given online application. Such applications may be SaaS applications like WebEx, Office365 Teams, Zoom, or other home-grown applications each of which may have different approaches towards QoE and various SLAs. In general, the application experience metrics may take the form of any metrics collected or computed over time that are indicative of the QoE of the application. For instance, such QoE metrics may include, but are not limited to, metrics of any or all of the following types:

SLA-related information, such as a probability of the SLA associated with the application being violated.

MOS scores

Concealment metrics

Metrics based on user-provided feedback ratings (e.g., users of a call rating it on a scale of 1-5 stars, etc.).

Etc.

Thus, application experience aware engine 502 may obtain QoE metrics for a given application for one or more types of metrics over time, essentially resulting in one or more QoE-related timeseries for analysis by traffic sensitivity analysis process 249. As would be appreciated, application experience aware engine 502 may obtain the QoE metrics from any number of sources, which could also vary depending on the type of metric. For instance, application experience aware engine 502 may obtain the QoE metrics from a data lake configured to aggregate the metrics, via an API with the online application, from one or more networking devices, or the like.

In addition to obtaining the QoE metrics for an online application, application experience aware engine 502 may also obtain traffic flow information for the traffic associated with an online application of interest. For instance, application experience aware engine 502 may obtain information regarding the amount of traffic of the online application that is conveyed via a certain network path/endpoint interface. For a particular interface, application experience aware engine 502 may use this information to track the QoE and traffic for all of the paths associated with that interface. Application experience aware engine 502 may also obtain the metrics for any or all of the other interfaces connected to that particular interface, with the connection being a single hop connection or composed of multiple hops. In turn, application experience aware engine 502 may make its data available to the other components of traffic sensitivity analysis process 249 for further analysis (e.g., by storing the data in a data lake or other repository).

In various embodiments, traffic sensitivity identifier 504 may be responsible for identifying network paths and interfaces that might be sensitive to traffic increases. To do so, traffic sensitivity identifier 504 may determine whether there is a correlation between the QoE metrics of an application and the amount of traffic sent via a certain path or interface. In further embodiments, in addition to assessing such correlations, traffic sensitivity identifier 504 may also compute metrics that indicate any or all of the following:

Specific traffic thresholds at which the QoE for the path/interface is observed to degrade. These thresholds can be specified for the entire traffic being carried or be specific to each application class.

Whether the traffic sensitivity is specific to a certain type of traffic. For instance, the application QoE may only degrade with increases in the amount of video traffic, which consists of larger-sized packets.

Significant changes or correlations with other system specific information from the networking device(s) associated with the path/interface, such as CPU usage, CPU temperature, memory usage, etc.

Time series characteristics such as seasonality, trends, change-points, variance, occurrence of peaks, etc. from the metrics.

Figure 6:
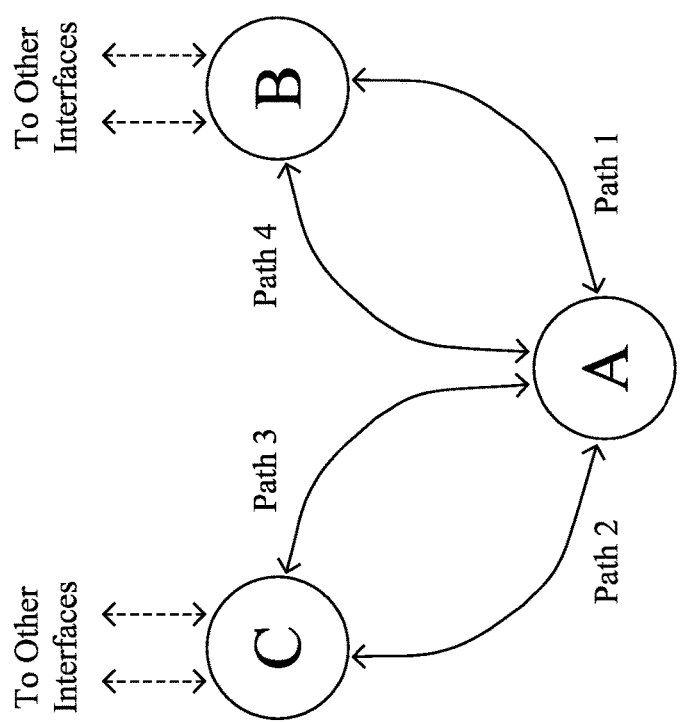
FIG. 6 illustrates an example of interconnected site interfaces in a software defined wide area network (SD-WAN)
Figure 6:
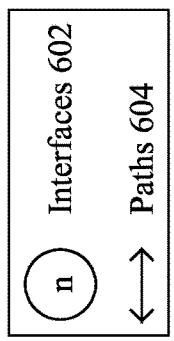

By way of example, FIG. 6 illustrates an example 600 of interconnected site interfaces in an SD-WAN. As shown, assume that the SD-WAN includes a plurality of interfaces 602, such as interfaces 'A,' 'B,' and 'C' of networking devices located at different physical sites/locations. These interfaces may each be connected to the other interfaces via two MPLS paths 604. For instance, interface 'A' may be connected via two paths 604 to interface 'B' and another two paths 604 to interface 'C.'

Figure 7A:
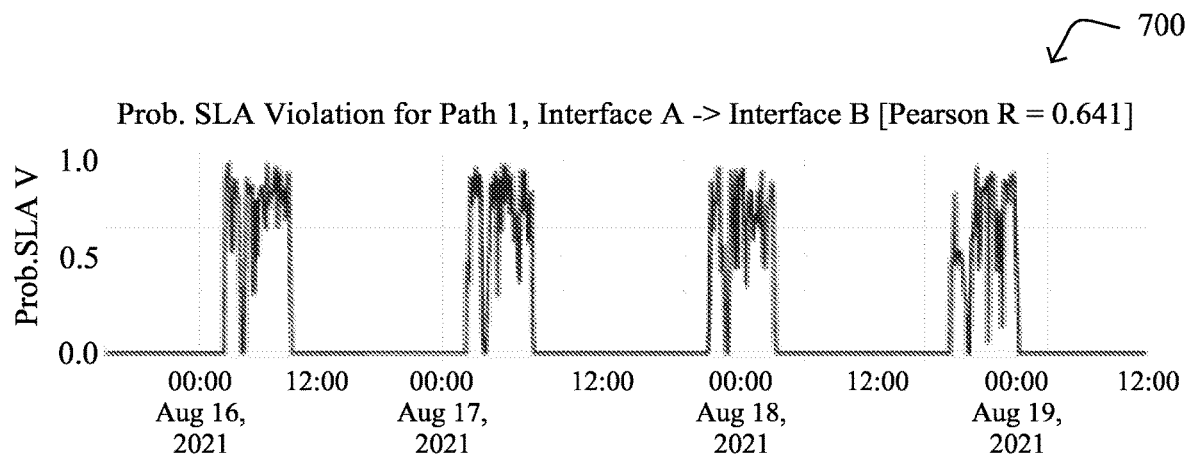
FIGS. 7A-7E illustrate example plots of timeseries for different paths and interfaces in a network.
Figure 7B:
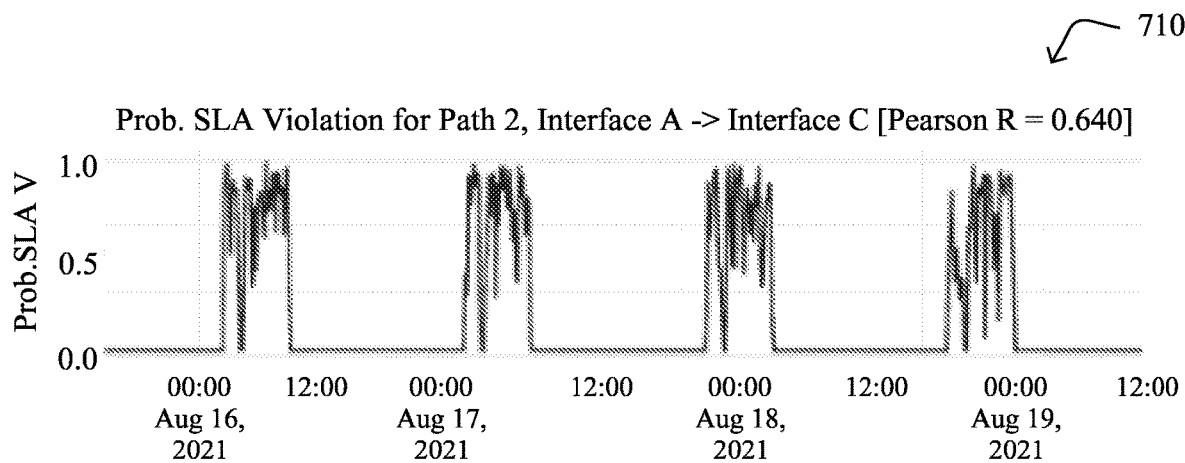
Figure 7C:
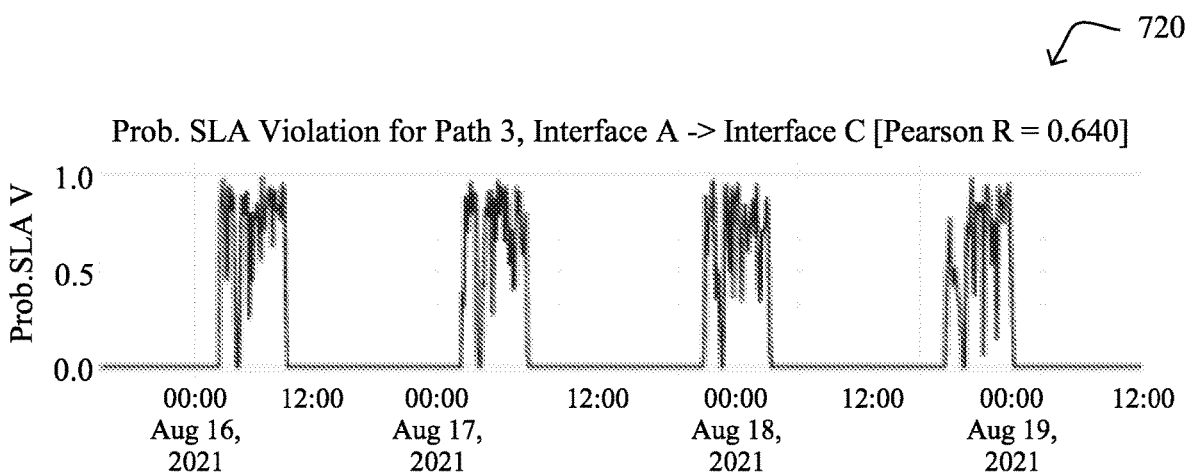
Figure 7D:
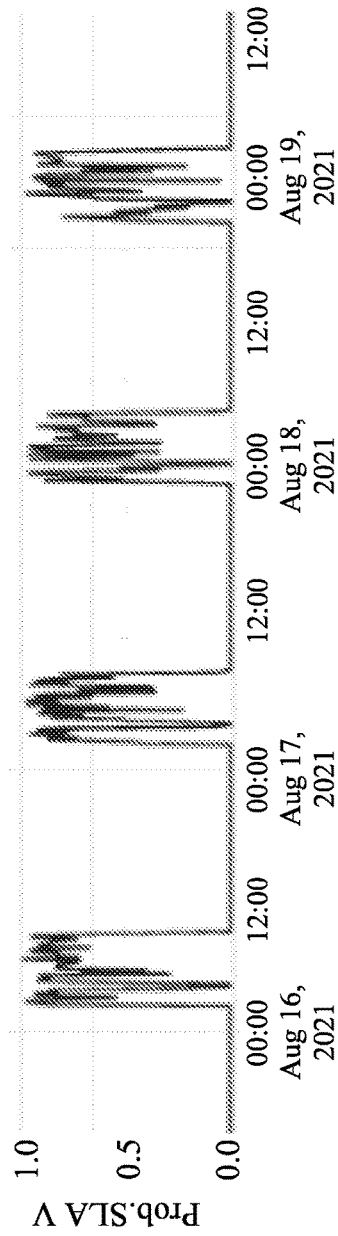
Figure 7E:
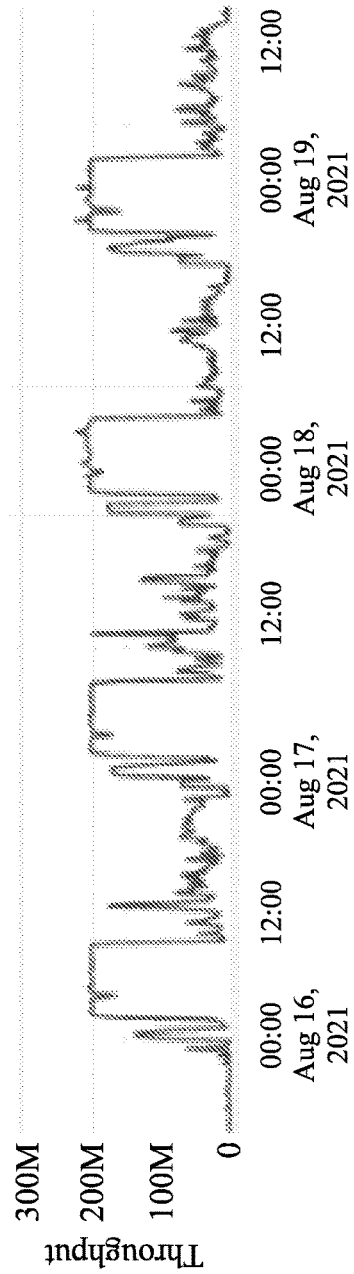

To illustrate the correlation between QoE metrics and traffic that can indicate traffic sensitivity, FIGS. 7A-7E illustrate example plots of timeseries for different paths and interfaces in a network. As shown, plots 700-730 in FIGS. 7A-7D depict timeseries for the four paths shown in FIG. 6 of their QoE metrics (e.g., the probabilities of them exhibiting a SLA violation) over time. In addition, FIG. 7E illustrates an example plot 704 of the throughput traffic of interface 'A' in FIG. 6 over time.

From FIGS. 7A-7E, it can be seen that the application QoE for all paths passing through interface 'A' are highly correlated with the total throughput of interface 'A.' The Pearson's correlation for the probability of an SLA violation (Prob. SLAV) of all of the paths to the total throughput of interface A is also high at around 0.64 with a P-Value<Thus, there is a strong correlation between the QoE metrics and the throughput metrics for the interface, indicating that it may be traffic sensitive.

Referring again to FIG. 5, another potential function of traffic sensitivity identifier 504 is to provide its findings to a user interface for review. For instance, in the case in FIG. 6, traffic sensitivity identifier 504 may indicate that interface 'A' is potentially traffic sensitive, any traffic thresholds at which this behavior is observed, etc. In one embodiment, traffic sensitivity identifier 504 may flag the interface as potentially being traffic sensitive if both of the following conditions are met:

The interface has significant changes in its observed total throughput (e.g., above a defined threshold)

For all paths passing through the interface, the Pearson's correlation coefficient between the QoE metrics and the total throughput of the interface is greater than 0.5 with a P-value of <0.05. Of course, other correlation coefficients or measures, as well as other thresholds, could also be used, as desired.

FIGS. 8A-8B illustrate example plots 800 and 810 contrasting the percentages of paths that are sensitive to traffic increases versus site interfaces that are sensitive to traffic increases. More specifically, plot 800 shows the percentages of paths per customer that are traffic sensitive, while plot 810 shows the percentages of interfaces per customer that are traffic sensitive. Here, it can be seen that not all traffic sensitivity exhibited by an interface is caused by the interface itself and may be due to bottlenecks/congestion deeper into the network.

According to various embodiments, sensitivity verification and root causing engine 506 may determine whether the potential traffic sensitivity identified by traffic sensitivity identifier 504 is indeed due to certain bottlenecks present in the network. Sensitivity verification and root causing engine 506 may also present the possible root causes of such bottlenecks to a user interface for review, in some instances. In another embodiment, sensitivity verification and root causing engine 506 may make use of user feedback for its traffic sensitivity indications and root-cause suggestions, to learn and update its systems.

In some embodiments, sensitivity verification and root causing engine 506 may verify that a particular interface is traffic sensitive because of bottlenecks within the interface and NOT because of remote effects on the QoE metrics of the paths associated to the interface (e.g., probability of an SLA violation). In one embodiment, sensitivity verification and root causing engine 506 may accomplish this by analyzing the correlations of the per-path QoE metrics with the throughput of the interfaces that are remote to the local interface under consideration.

By way of example, consider again the example in FIG. 6, where interface A is indicated to be traffic sensitive because all of its paths exhibited a correlation between their probability of SLA violation metrics and the throughput of interface A. In the case of interface A, for instance, its remote interfaces are interfaces B and C. Now, assume that their respective throughput timeseries are shown in plots 900, 910, respectively, in FIGS. 9A-9B. As shown, plots 900, 910 are from the same timespan as those of plots 700-740 in FIGS. 7A-7E.

Figure 9A:
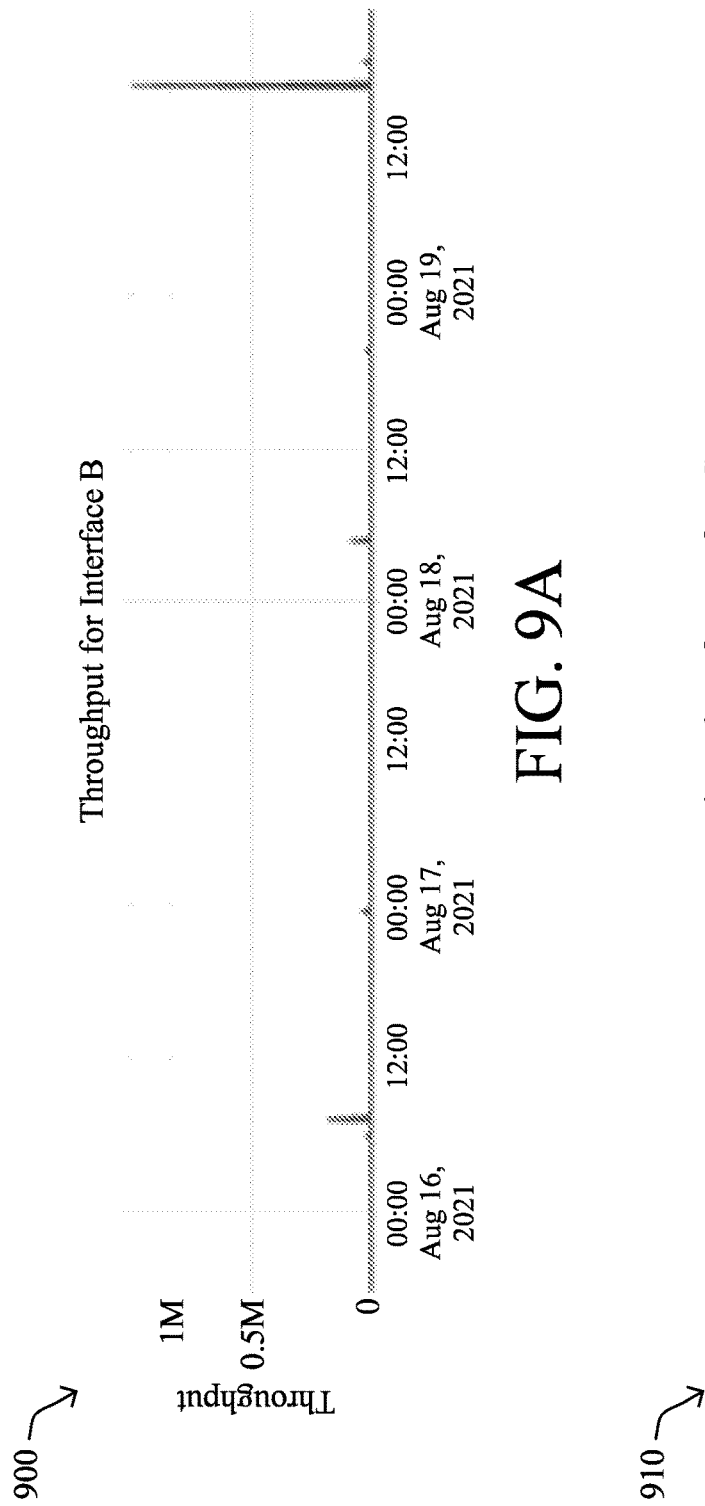
FIGS. 9A-9B illustrate example plots of throughput timeseries for different interfaces.
Figure 9B:
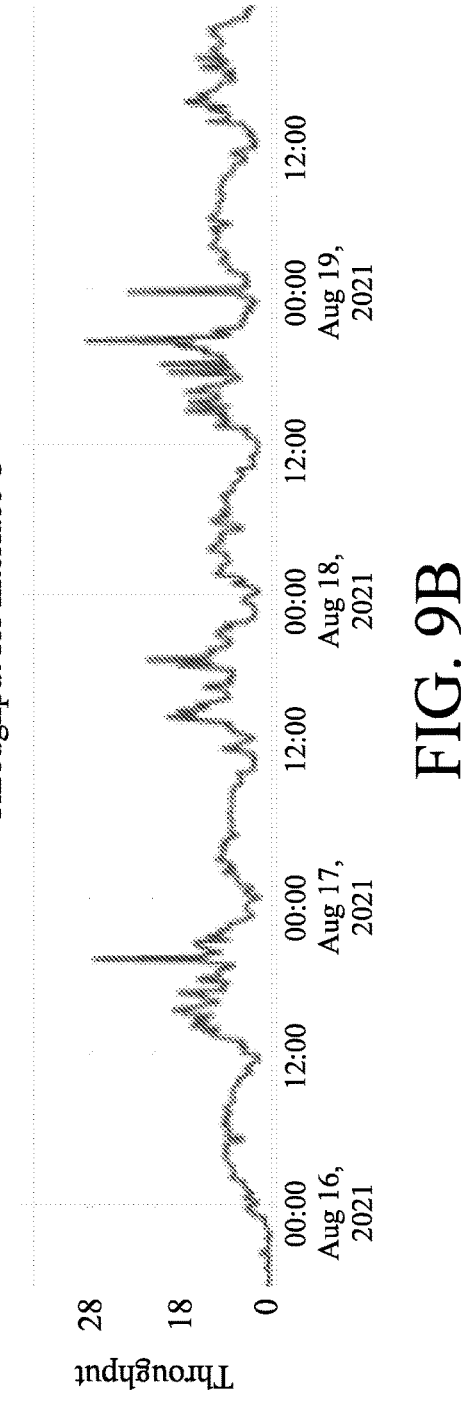

From FIGS. 9A-9B, it can be seen that neither interface B nor interface C exhibit a correlation between their throughputs and the degradation to the QoE metrics shown in FIGS. 7A-7D. This means that the traffic sensitivity of interface A previously identified by traffic sensitivity identifier 504 could be attributable to a congestion phenomenon local to interface A, thereby verifying that interface A is indeed the root cause.

Referring again to FIG. 5, sensitivity verification and root causing engine 506 may leverage causal discovery and inference models, to ascertain whether a change in traffic on a local link is in fact causing the observed traffic sensitivity, in other embodiments. Examples of such causal discovery models are independence based causal discovery and semi-parametric causal discovery models. Such models analyze the observed data and discover causal relationships between, say, interface throughput and the probability of an SLA violation or other QoE metrics.

In further embodiments, sensitivity verification and root causing engine 506 may analyze system logs to identify buffer overflows, bandwidth bottlenecks etc., to provide visibility into the system specific factors when spikes in the traffic occur. In some implementations, these can be provided to a user interface for review as supplementary information while collecting feedback or even used by traffic sensitivity analysis process 249 for purposes of suggesting configuration changes.

In yet another embodiment, sensitivity verification and root causing engine 506 may interact with a configuration agent such as an SD-WAN controller, to obtain the configuration of the interface. Such information may indicate, for instance, the theoretical link bandwidth, which sensitivity verification and root causing engine 506 can use to check whether the traffic peak matches the maximum link local bandwidth.

In various embodiments, bottleneck verification engine 508 may be in charge of generating local traffic to check the traffic sensitivity of a local interface. While bottleneck verification engine 508 may be optional in some implementations, it also provides for a true verification of the traffic sensitivity of the interface by interacting with the networking devices, which is the only true way to verify causation (e.g., the root cause of the traffic sensitivity is a lack of capacity on the local link). Thus, this approach may yield more trustworthy results than one that relies solely on pure correlation.

In one embodiment, bottleneck verification engine 508 may mimic traffic of interest (e.g., O365, Webex, etc.) by installing a local agent at the networking device. Such an agent may be in charge of generating traffic with various traffic loads on the interface while measuring the related QoE until QoE degradation is observed.

In a second embodiment, the traffic generated could be superposed with existing traffic. However, doing so could also be more disruptive to the actual traffic in the network. In either case, traffic tests that rely on generating synthetic traffic to test the response of the interface may be performed during non-peak hours, to ascertain whether the root cause of the traffic sensitivity is a lack of capacity on the link local/interface, as opposed to the network.

In various embodiments, link configurator 510 may be responsible for triggering some configuration changes on the local link. To do so, in some instances, link configurator 510 may first send a notification to a user interface to inform an administrator of the traffic sensitive interface(s), the set of QoE degradations for the application(s), and/or other information generated by traffic sensitivity analysis process 249. In turn, the administrator may opt to initiate any number of corrective measures with respect to the interface.

In absence of QoS, an initial approach to addressing a traffic sensitive interface may consists in identifying all critical applications that are experiencing QoE degradation in the presence of traffic increases, assign a dedicated queue, and color the traffic to be sent on the newly created queue. If a preemptive queue is used by the system, no other parameters have to be tuned. However, if a bandwidth is specifically allocated to the new queue, then link configurator 510 may initially allocate a lower bandwidth that can be increased, if needed.

After configuration of a new queue for the interface for use by the application traffic, link configurator 510 may also observe whether the traffic sensitivity of the interface has resolved (e.g., the critical traffic now benefits from QoS, thus there is no longer any QoE degradation even in presence of heavy load on the interface). If the condition is not resolved, the bandwidth allocated to the new queue may be increased.

In addition, link configurator 510 may also monitor the traffic and related QoE for all applications not sent to the priority (new) queue, to observe any further degradation of QoE. If the bandwidth allocated to the new queue cannot clear the QoE degradation condition for the related applications and/or other applications suffer QoE degradation because of a lack of resources, link configurator 510 may then send a notification to a user interface indicating that the only real solution may be to increase the local link bandwidth capacity or the contract with the service provider.

Figure 10:
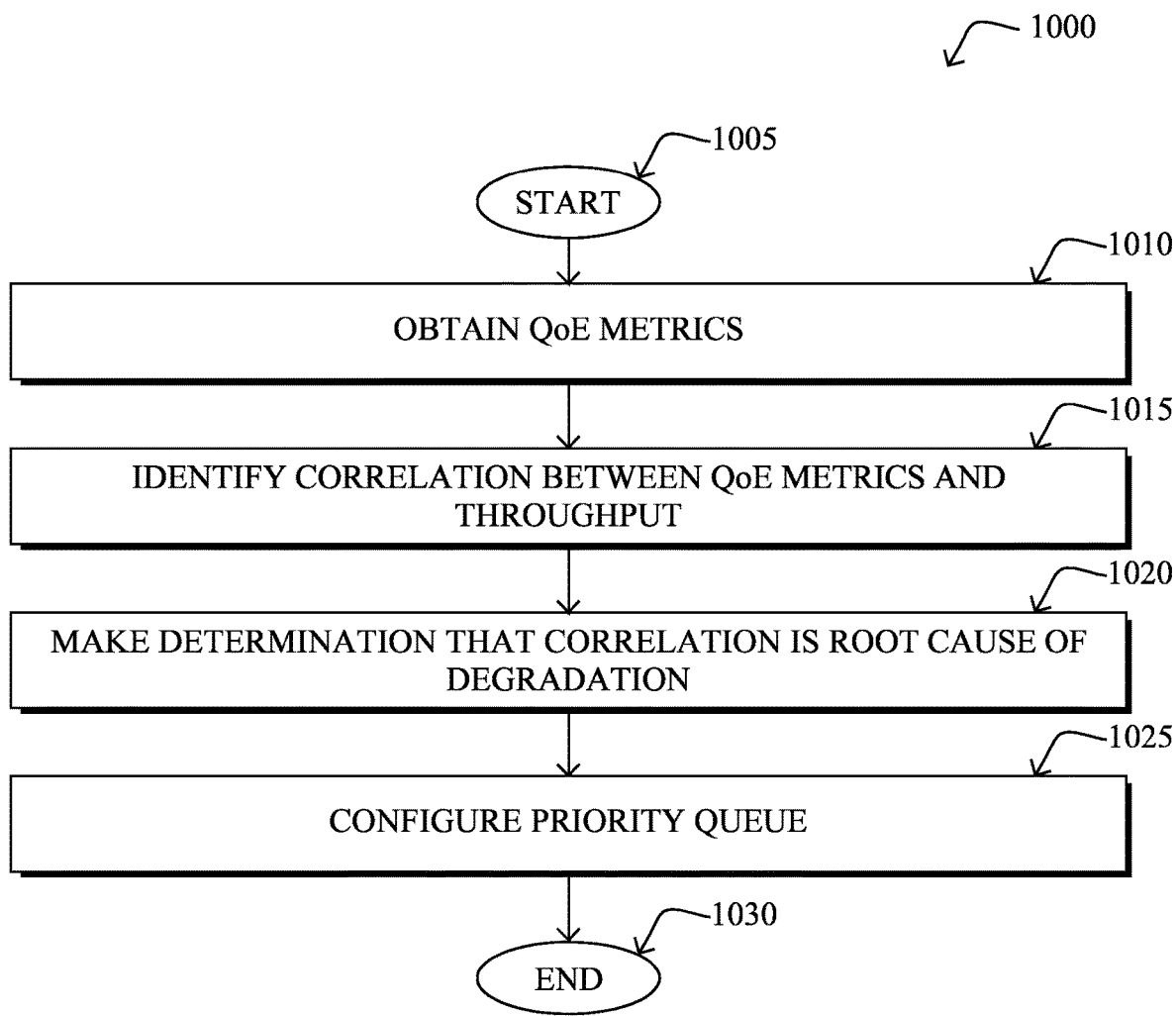
FIG. 10 illustrates an example simplified procedure for identifying traffic sensitive interfaces and triggering configuration changes.

FIG. 10 illustrates an example simplified procedure for identifying traffic sensitive interfaces and triggering configuration changes, in accordance with one or more embodiments described herein. For example, a non-generic, specifically configured device (e.g., device 200), such as controller for a network (e.g., an SDN controller), a server (e.g., a server associated with the online application), a networking device, or any other device in communication therewith, may perform procedure 1000 by executing stored instructions (e.g., process 249). The procedure 1000 may start at step 1005, and continues to step 1010, where, as described in greater detail above, the device may obtain quality of experience metrics for an online application whose traffic traverses a particular interface of a router located at a first site in a network. In various embodiments, the quality of experience metrics may comprise at least one of: metrics based on feedback supplied by users of the online application or metrics indicative of a probability that a service level agreement will be violated. In one embodiment, the network may be a software defined network (SDN), such as a software defined wide area network (SD-WAN).

At step 1015, as detailed above, the device may identify a correlation between throughput of the particular interface and the quality of experience metrics for the online application. In some embodiments, the device may also determine whether the quality of experience metrics of the online application are correlated with resource usage metric or sensor measurement of the route. In one embodiment, the device may also identify a threshold throughput of the particular interface at which degradation of the quality of experience metrics is observed. In another embodiment, the device may also determine whether degradation of the quality of experience metrics are associated with a particular type of traffic of the online application.

At step 1020, the device may make a determination that the correlation is a root cause of degradation of the quality of experience metrics for the online application, as described in greater detail above. In various embodiments, the device may do so at least in part by determining whether throughput of an interface of a remote router located at a second site in the network is correlated with the quality of experience metrics. In some embodiments, the device may also verify the determination by testing whether the degradation can be repeated by sending traffic that mimics the traffic of the online application via the particular interface. In one embodiment, the device may also provide an indication of the determination for presentation by a user interface.

At step 1025, as detailed above, the device may configure, based on the determination, a priority queue associated with the particular interface for use by traffic of the online application. In one embodiment, the device may also increase an allocated bandwidth of the priority queue, based on a determination that configuration of the priority queue has not resolved the degradation. In a further embodiment, the device may also send a notification to a user interface that a link bandwidth capacity associated with the particular interface should be increased, based on a determination that increasing the allocated bandwidth of the priority queue has not resolved the degradation. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for identifying traffic sensitive interfaces and triggering configuration changes, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, quality of experience metrics for an online application whose traffic traverses a particular interface of a router located at a first site in a network, wherein the quality of experience metrics comprise metrics based on feedback supplied by users of the online application;
identifying, by the device, a correlation between throughput of the particular interface and the quality of experience metrics for the online application by using a causal discovery and inference model;
making, by the device and based on the correlation, a determination that the particular interface is a root cause of degradation of the quality of experience metrics for the online application at least in part by determining whether throughput of an interface of a remote router located at a second site in the network is correlated with the quality of experience metrics; and
configuring, by the device and based on the determination, a priority queue associated with the particular interface for use by traffic of the online application.

2. The method as in claim 1, wherein the quality of experience metrics further comprise metrics indicative of a probability that a service level agreement will be violated.

3. The method as in claim 1, further comprising:
verifying, by the device, the determination by testing whether the degradation can be repeated by sending traffic that mimics the traffic of the online application via the particular interface.

4. The method as in claim 1, further comprising:
determining, by the device, whether the quality of experience metrics of the online application are correlated with resource usage metric or sensor measurement of the router.

5. The method as in claim 1, further comprising:
providing, by the device, an indication of the determination for presentation by a user interface.

6. The method as in claim 1, further comprising:
identifying, by the device, a threshold throughput of the particular interface at which degradation of the quality of experience metrics is observed.

7. The method as in claim 1, further comprising:
determining, by the device, whether degradation of the quality of experience metrics are associated with a particular type of traffic of the online application.

8. The method as in claim 1, further comprising:
increasing, by the device, an allocated bandwidth of the priority queue, based on a determination that configuration of the priority queue has not resolved the degradation.

9. The method as in claim 8, further comprising:
sending, by the device, a notification to a user interface that a link bandwidth capacity associated with the particular interface should be increased, based on a determination that increasing the allocated bandwidth of the priority queue has not resolved the degradation.

10. The method as in claim 1, wherein network comprises a software-defined network.

11. An apparatus, comprising:
one or more network interfaces;
a processor coupled to the one or more network interfaces and configured to execute one or more processes; and
a memory configured to store a process that is executable by the processor, the process when executed configured to:
obtain quality of experience metrics for an online application whose traffic traverses a particular interface of a router located at a first site in a network, wherein the quality of experience metrics comprise metrics based on feedback supplied by users of the online application;
identify a correlation between throughput of the particular interface and the quality of experience metrics for the online application by using a causal discovery and inference model;
make, based on the correlation, a determination that the particular interface is a root cause of degradation of the quality of experience metrics for the online application at least in part by determining whether throughput of an interface of a remote router located at a second site in the network is correlated with the quality of experience metrics; and
configure, based on the determination, a priority queue associated with the particular interface for use by traffic of the online application.

12. The apparatus as in claim 11, wherein the quality of experience metrics further comprise metrics indicative of a probability that a service level agreement will be violated.

13. The apparatus as in claim 11, wherein the process when executed is further configured to:
verify the determination by testing whether the degradation can be repeated by sending traffic that mimics the traffic of the online application via the particular interface.

14. The apparatus as in claim 11, wherein the process when executed is further configured to:
determine whether the quality of experience metrics of the online application are correlated with resource usage metric or sensor measurement of the router.

15. The apparatus as in claim 11, wherein the process when executed is further configured to:
provide an indication of the determination for presentation by a user interface.

16. The apparatus as in claim 11, wherein the process when executed is further configured to:
identify a threshold throughput of the particular interface at which degradation of the quality of experience metrics is observed.

17. The apparatus as in claim 11, wherein the process when executed is further configured to:
determine whether degradation of the quality of experience metrics are associated with a particular type of traffic of the online application.

18. The apparatus as in claim 11, wherein the process when executed is further configured to:

increase an allocated bandwidth of the priority queue, based on a determination that configuration of the priority queue has not resolved the degradation.

19. The apparatus as in claim 18, wherein the process when executed is further configured to:

send a notification to a user interface that a link bandwidth capacity associated with the particular interface should be increased, based on a determination that increasing the allocated bandwidth of the priority queue has not resolved the degradation.

20. A tangible, non-transitory, computer-readable medium storing program instructions that cause a device to execute a process comprising:

obtaining, by the device, quality of experience metrics for an online application whose traffic traverses a particular interface of a router located at a first site in a network, wherein the quality of experience metrics comprise metrics based on feedback supplied by users of the online application;

identifying, by the device, a correlation between throughput of the particular interface and the quality of experience metrics for the online application by using a causal discovery and inference model;

making, by the device and based on the correlation, a determination that the particular interface is a root cause of degradation of the quality of experience metrics for the online application at least in part by determining whether throughput of an interface of a remote router located at a second site in the network is correlated with the quality of experience metrics; and configuring, by the device and based on the determination, a priority queue associated with the particular interface for use by traffic of the online application.

* * * * *

UNITED STATES PATENT AND TRADEMARK OFFICE
CERTIFICATE OF CORRECTION

PATENT NO. : 12,143,290 B2
APPLICATION NO. : 17/871142
DATED : November 12, 2024
INVENTOR(S) : Mukund Yelahanka Raghuprasad et al.

Page 1 of 1

It is certified that error appears in the above-identified patent and that said Letters Patent is hereby corrected as shown below:

In the Specification

Column 7, Line 66 please amend as shown:
FIG. 4A illustrates an example SDN implementation 400, Column 9, Line 37 please amend as shown:
in contrast with the notion of an informed decision.

Column 13, Line 33 please amend as shown:
interface A is also high at around 0.64 with a P-Value< 0.05. Thus, Signed and Sealed this
Eleventh Day of February, 2025

Coke Morgan Stewart
*Acting Director of the United States Patent and Trademark Office*